(12) United States Patent
Buettner

(10) Patent No.: US 6,198,923 B1
(45) Date of Patent: Mar. 6, 2001

(54) METHOD FOR TRANSMITTING INFORMATION BETWEEN MOBILE STATIONS AND A COMMUNICATION NETWORK

(75) Inventor: Hartmut Buettner, Haunetal (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/014,113

(22) Filed: Jan. 27, 1998

(30) Foreign Application Priority Data

Jan. 27, 1997 (DE) ............................................. 197 02 868

(51) Int. Cl.⁷ ...................................................... H04Q 7/20
(52) U.S. Cl. .......................... 455/433; 455/445; 455/425; 455/450
(58) Field of Search ..................................... 455/433, 423, 455/424, 425, 67.1, 68, 435, 466, 426, 557, 450, 445

(56) References Cited

U.S. PATENT DOCUMENTS

| | | | |
|---|---|---|---|
| 5,487,175 | * | 1/1996 | Bayley et al. ....................... 455/422 |
| 5,504,804 | * | 4/1996 | Widmark et al. ..................... 455/414 |
| 5,513,242 | * | 4/1996 | Mukerjee et al. .................... 455/403 |
| 5,564,071 | * | 10/1996 | Liou et al. ............................ 455/520 |
| 5,603,085 | * | 2/1997 | Shedlo .................................. 455/450 |
| 5,802,471 | * | 9/1998 | Sawai et al. .......................... 455/445 |
| 5,903,832 | * | 5/1999 | Seppanen et al. .................... 455/414 |
| 5,943,616 | * | 8/1999 | Andersson ........................... 455/422 |

FOREIGN PATENT DOCUMENTS

| | | |
|---|---|---|
| 33 37 648 | 2/1987 | (DE) . |
| 195 20 632 | 12/1996 | (DE) . |

* cited by examiner

*Primary Examiner*—Dwayne D. Bost
*Assistant Examiner*—Erika A. Gary
(74) *Attorney, Agent, or Firm*—Schiff Hardin & Waite

(57) ABSTRACT

In a method for transmitting information between mobile stations and a communication network operating according to the method, equipment information identifying additional devices respectively connected to a mobile station is provided by the mobile station and is sent to the communication network, and the equipment information received by the communication network is stored and checked before the allocation of switching-based and/or radio-based resources for a connection setup to the mobile station. The communication network thus is informed about the equipping of the mobile stations with additional devices, so that, before the occupation and allocation of components and transmission capacity, it can already be decided at the network whether it makes sense to execute a particular service (such as e.g. telefax or data service) to the mobile station, or, alternatively, to reject it immediately because the mobile station, on the basis of the equipment information stored for it, is not capable of receiving the information which is proposed to be sent out via the radio interface. By evaluation of the equipment information stored in the communication network concerning connected additional devices, it is possible at the network to carry out the transmission of information, and in particular the allocation of resources, more economically.

12 Claims, 2 Drawing Sheets

METHOD FOR TRANSMITTING INFORMATION BETWEEN MOBILE STATIONS AND A COMMUNICATION NETWORK

BACKGROUND OF THE INVENTION

1. Field of the Invention

The present invention is directed to a method for transmitting items of information between mobile stations and a communication network, a communication network operating according to the method, and a mobile station operating according to the method.

2. Description of the Prior Art

Communication networks, for example the mobile radiotelephone network according to the GSM standard (Global System for Mobile Communication), enable communication connections to mobile stations of mobile subscribers via a radio interface. The communication network is provided with radio-based components in a radio-based subsystem and with switching-oriented means in a switching-based subsystem. The communication connections are set up, maintained and dismantled by transmitting and receiving items of signaling information and traffic information (e.g. in the form of speech or data) in both transmission directions via the radio interface. The access of the mobile subscribers to the communication network ensues by means of the mobile stations, which can communicate in wireless fashion with radio stations (base stations) arranged in distributed fashion at the network side.

During the commissioning (i.e., bringing "on line") of the mobile station into the communication network, only the basic characteristics of the mobile station, such as for example transmission power, encryption algorithm, support of a short message service, are transmitted. It is not known to the communication network whether a mobile subscriber whose SIM (Subscriber Identity Module) card is in principle cleared for particular services (e.g., data services or fax services) can also actually use these services. This has the consequence that, for example, telefax calls or data calls coming in from the communication network via the radio interface are provided to the mobile station in question by the call without insurance that a successful data transmission will occur between the communication network and the mobile station. This is because if the mobile station is not equipped with the additional device or devices necessary to receive the data, the data call cannot be accepted by the mobile station and the transmitted data cannot be made available as an output. The data call must thus be rejected by the mobile station, and corresponding signaling information must be sent back to the communication network. The lack of knowledge of the relevant technological possibilities at the mobile station for the use of additional services leads to an unnecessary network load, because resources have to be provided for the transmission of traffic information without resulting in a successful transmission of this information. This is particularly disadvantageous in communication networks with a radio interface, since the transmission capacity and the radio-based resources available via air are limited, and generally form a bottleneck in the transmission of information.

SUMMARY OF THE INVENTION

It is an object of the present invention to provide a method and a communication network and mobile station wherein the allocation of resources at the network for the transmission of information via the radio interface in the use of services can take place more effectively.

The above object is achieved in the method according to the invention, wherein equipment information (i.e., equipment messages, equipment designators) about each of the additional devices connected to a particular mobile station is provided by that mobile station and is sent to the communication network, and the equipment information of the mobile station received by the communication network is stored and checked before the allocation of switching-based and/or radio-based resources for a connection setup to the mobile station. Thus the communication network is informed about the equipping of the mobile stations with additional devices, so that it can be decided at the network, before the occupation and allocation of components and transmission capacity, whether it makes sense to execute a particular service (such as for example the telefax or data service) to the mobile station, or, alternatively, to reject this immediately, because, on the basis of the equipment information stored for it, the mobile station is not capable of receiving the traffic information in the form which is proposed to be sent via the radio interface. Instead of the occupation of resources, in particular the radio interface, for an unsuccessful transmission of information, these resources can be used in the meantime for other services that will be successful. By means of the evaluation of the equipment information stored in the communication network, concerning connected additional devices, it is possible to carry out the transmission of information more economically, within the network, and in particular the allocation of resources is conserved.

The communication network according to the invention includes a receiver stage which receives the equipment information concerning the additional devices connected to a particular mobile station, as well as a memory arrangement for storing and checking the equipment information received from the mobile station before the allocation of switching-based and/or radio-based resources. In this way, the connection setup for the transmission of information to the mobile station can be successfully carried out at the network, dependent on the stored equipment information, or, alternatively, can be prevented, without occupation of resources. The mobile station according to the invention includes components for providing the equipment information concerning the connected additional devices and a transmitter stage which transmits the equipment information to the communication network, which stores the received equipment information in a manner associating the equipment information with the mobile station that transmitted it and which checks the stored equipment information before the allocation of switching-based and/or radio-based resources.

Preferably the equipment information is transmitted in a signaling message at least during the commissioning of the mobile station into the communication network. In addition, according to another embodiment of the invention, the equipment information can be transmitted in a signaling message after the commissioning of the mobile station into the communication network. It is particularly advantageous if the items of equipment information are transmitted in the signaling message as soon as a change of equipping with additional devices is determined by the mobile station. The communication network is thereby made capable from the outset of obtaining information concerning the additional devices connected to the mobile station, and is thus able to recognize, for example, a change of equipment in relation to the additional devices immediately during operation. In this latter version, the transmission of the signaling message from the mobile station to the communication network also ensues without a change of location of the mobile subscriber.

In an embodiment of the invention, the equipment information is used to signal to the communication network whether and which additional devices are connected to the mobile station, and/or for what purpose the mobile station with at least one connected additional device is used by the subscriber. In a further embodiment of the invention, the additional devices are connected via interface terminals of the mobile station, via which the operational readiness of the additional devices and/or the change of equipment is signaled to the mobile station.

In another embodiment of the invention, a message determined according to the GSM standard, into which the equipment information is inserted, is employed as a signaling message. Alternatively, a new message (not determined in the GSM standard), which contains the equipment information, can be used.

In a further embodiment of the invention, the storage of the equipment information ensues by means of a home location register (HLR) of a mobile radiotelephone network. In another embodiment the storage of the equipment information takes place in a visitor location register (VLR) of the mobile radiotelephone network.

DESCRIPTION OF THE PREFERRED EMBODIMENTS

Figure 1:
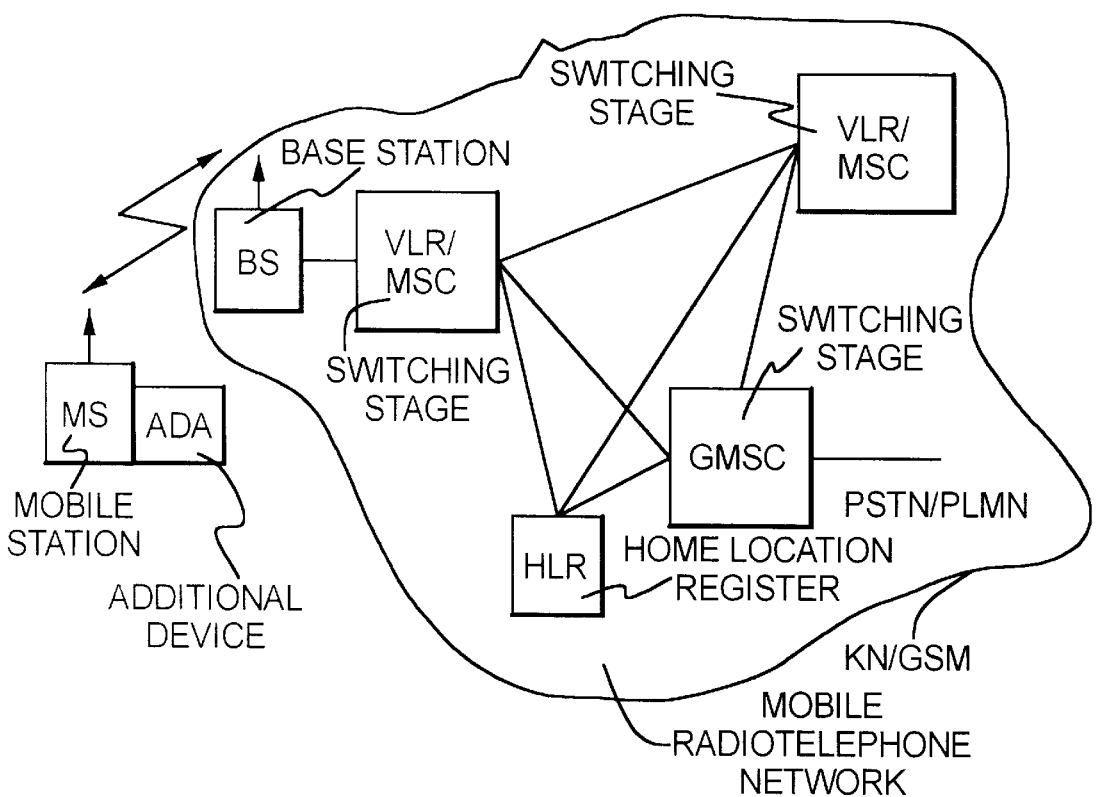
FIG. 1 is a simplified block switching diagram of a mobile radiotelephone system with a mobile station and a mobile radiotelephone network, in which an inventively operating mobile station and network can be employed.

The communication network KN according to FIG. 1 is, for example, constructed as a GSM mobile radiotelephone network GSM. For this purpose, it includes switching stages VLR/MSC and GMSC, which belong to the switching-based subsystem of a mobile radiotelephone system and are connected with one another. The switching stage VLR/MSC creates the connection to a mobile subscriber via a base station BS and via a radio interface between the base station BS and a mobile station MS. Conventionally, several base stations and base station controllers, arranged in distributed fashion over the entire radio coverage area, form the radio-based subsystem of the mobile radiotelephone system. The switching stage VLR/MSC is thereby connected to the base stations via the base station controllers. A further switching stage GMSC forms the gateway into at least one further network, which can be, for example, a fixed network PSTN or a mobile radiotelephone network PLMN.

The mobile station MS is the communication terminal apparatus of the mobile subscriber. It can be provided with additional devices ADA that can be connected with interface terminals of the mobile station. Thus, e.g. pluggable data adapters or telefax adapters for transmission of data to/from the mobile station MS can be connected. Display screens, mass memories or entire apparatuses can also be connected to the mobile station MS as additional devices ADA. Each mobile station MS in principle can be used by the mobile subscriber with or without the additional devices ADA. For particular applications of the mobile station MS, for example for data transmission, the reception of items of traffic control information, the calculation of usage fees, etc., the connection of the additional devices ADA is required for the successful transmission of information. When such additional devices ADA are used, an exchange of control signals ensues between the additional devices ADA and the mobile station MS for signaling the presence or absence of the additional devices ADA. By means of the evaluation of the control signals in the signal processor in the mobile station MS, which is present anyway, can be recognized by the mobile station MS whether an additional device is connected to it and, if so, the connected additional device can be identified.

According to FIG. 1, at least one storage unit HLR is fashioned as a home location register for the subscriber data of the mobile subscribers, and is a self-contained unit that is connected with the switching stages VLR/MSC and GMSC, which are shown as examples. The switching stage VLR/MSC contains a memory unit VLR as a visitor location register containing subscriber data of mobile subscribers, as long as these subscribers are located in the service area of the switching means VLR/MSC.

Connection setup messages emanating from the mobile subscriber with the mobile station MS are first processed in the communication network KN by the switching stage VLR/MSC in whose service area the mobile subscriber is located at that moment. An interrogation of services, and in particular an identification of any of additional services that exist alongside the basic telecommunication services, is conducted by the switching stage VLR/MSC. Calls directed to the mobile subscribers are processed in the switching stage GMSC of the gateway. As an example, it can be assumed that the connection setup messages from the fixed network PSTN reach the switching stage GMSC of the gateway, which interrogates the services available within the mobile radiotelephone network GSM, or in other networks with which corresponding agreements exist.

The memory units HLR and VLR respectively contain information concerning the services that are registered for the subscribers, with the information concerning a location update being sent to the visitor location register VLR. This information is stored in addition to the subscriber data of a subscriber, e.g. allocated to the subscriber in tabular form. The additional information can contain messages or designations concerning several additional services SS. The administration and utilization of a data service with additional devices ADA connected to the mobile station MS is explained on the basis of the following figures.

Figure 2:
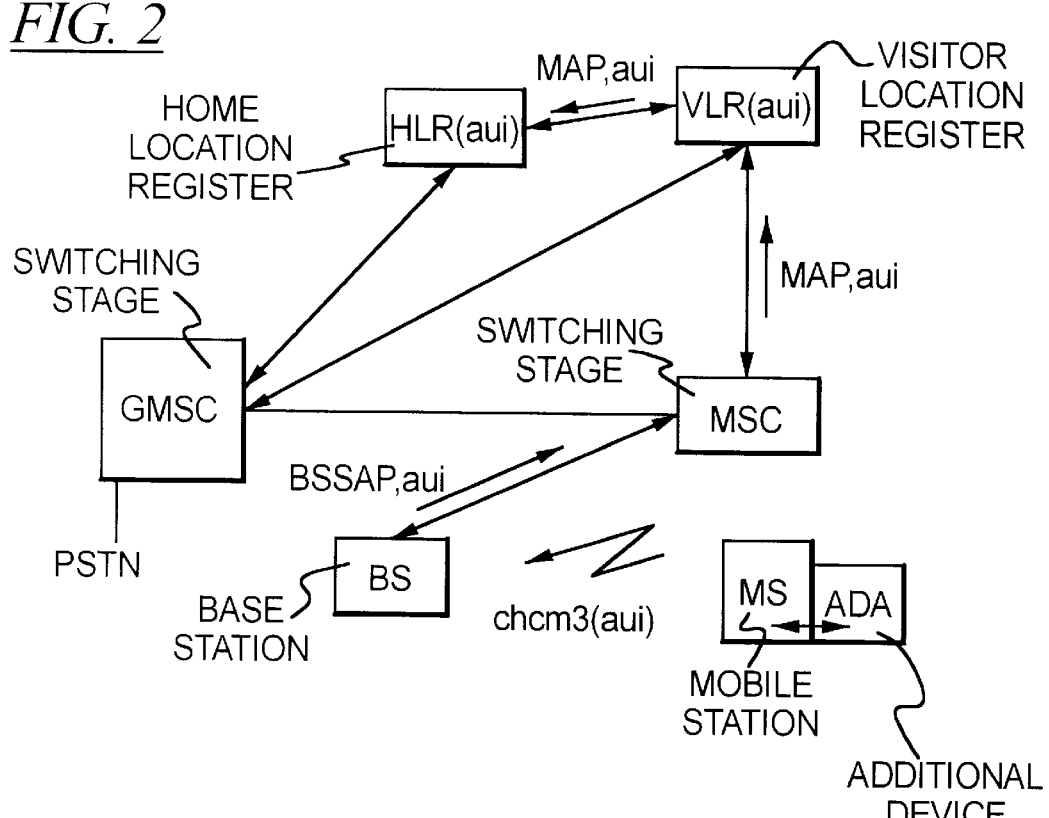
FIG. 2 schematically illustrates the manner and components for transmission of information in accordance with the inventive method.

FIG. 2 shows an arrangement for executing the inventive method. The mobile station MS receives via its interface terminals, information indicating that one or several additional devices ADA are connected and ready for operation, and produces equipment information aui for identifying the connected additional devices ADA. The mobile station recognizes the technological possibilities for the execution of particular services. In the present example, let it be assumed that as an additional device a data adapter is connected with the mobile station MS for data transmission. The equipment information aui consists for this case e.g. of an information item indicating that an additional apparatus is connected and an information item indicating that it is a data adapter. As soon as the mobile station MS is brought on line in the communication network, the equipment information aui provided by that mobile station MS are sent in addition to the basic information items (e.g., transmission power, encryption algorithm, support of short message service) which are to be communicated anyway. This can ensue, for example, in a signaling message chcm3 that is transmitted via the radio interface. As a signaling message chcm3, a message already defined in the GSM standard and used for transmitting information between the mobile station MS and the communication network, as well as a new message, can be used. The equipment information aui may relate not only to the connectable additional devices themselves, such as e.g. display screen, mass memory, data terminal apparatus, but also to the services and additional services supported thereby, such as e.g. the reception of items of traffic control information, or billing of usage fees at the site of telephoning.

The signaling message chcm3 with the equipment information aui is received at the network by the base station BS and is forwarded to the switching unit MSC responsible for the mobile station MS, or for the mobile subscriber. The transmission of the equipment information aui takes place according to the user part BSSAP that is defined in the GSM standard for the transmission at the interface between the radio-based subsystem and the switching-based subsystem. An advantage is that the existing protocol does not need to be modified in order to accommodate the additional transmission of the items of equipment information aui. The equipment information aui is first sent from the switching unit MSC to the allocated visitor location register VLR, in which the equipment information aui is stored in addition to the data registered for the mobile subscriber. For the transmission of the equipment information aui, the mobile radiotelephone-specific user part MAP, likewise already defined in the GSM standard, is advantageously used. Since the data of the mobile subscriber or of the mobile station MS are available in the visitor location register VLR only for the duration of the stay of that subscriber in the coverage area occupied by the base station BS, a transmission of the equipment information aui to the home location register HLR also takes place, where the equipment information aui is stored as permanent data. For this purpose, the visitor location register VLR sends the equipment information aui according to the user part MAP. An alternative possibility is to transparently send the equipment information aui by means of at least one container message (USSD, Unstructured Supplementary Services Data) from the mobile station MS to the home location register HLR in the communication network. The signaling message chcm3 can be transmitted by the mobile station MS to the communication network at any time, i.e. in particular after commissioning of the mobile station MS during the switched-on state. The mobile station MS is thus able to recognize a change in the equipment with additional devices and to respond accordingly, i.e. to send out new equipment information aui via the radio interface. For this purpose, the mobile station MS determines the modification on the basis of particular control signals in the signal processor that are received, for example, via at least two terminal pins (connected with one another) of an additional device ADA, and forms the new equipment information aui. A change of equipment is effected for example by plugging or unplugging of a data adapter or telefax adapter at the mobile station MS. The equipment information aui of the mobile station MS stored in the memory means of the communication network can be interrogated before the allocation of switching-based and/or radio-based resources, so that, for a possible connection setup, the status of the mobile station MS in relation to the technological possibilities due to connected additional devices is taken into account before the occupation of network capacity and transmission capacity—in particular on the radio interface. The probability of a successful transmission of information (data transmission in the present example) is thereby increased. A transmission of information will not succeed, due to additional devices not being connected, is avoided from the outset by means of evaluation of the equipment information aui stored and retrievable in the communication network, e.g. in the visitor location register VLR or in the home location register HLR. The result is an optimized connection protocol in carrying out call-related services or additional services in the communication network.

Figure 3:
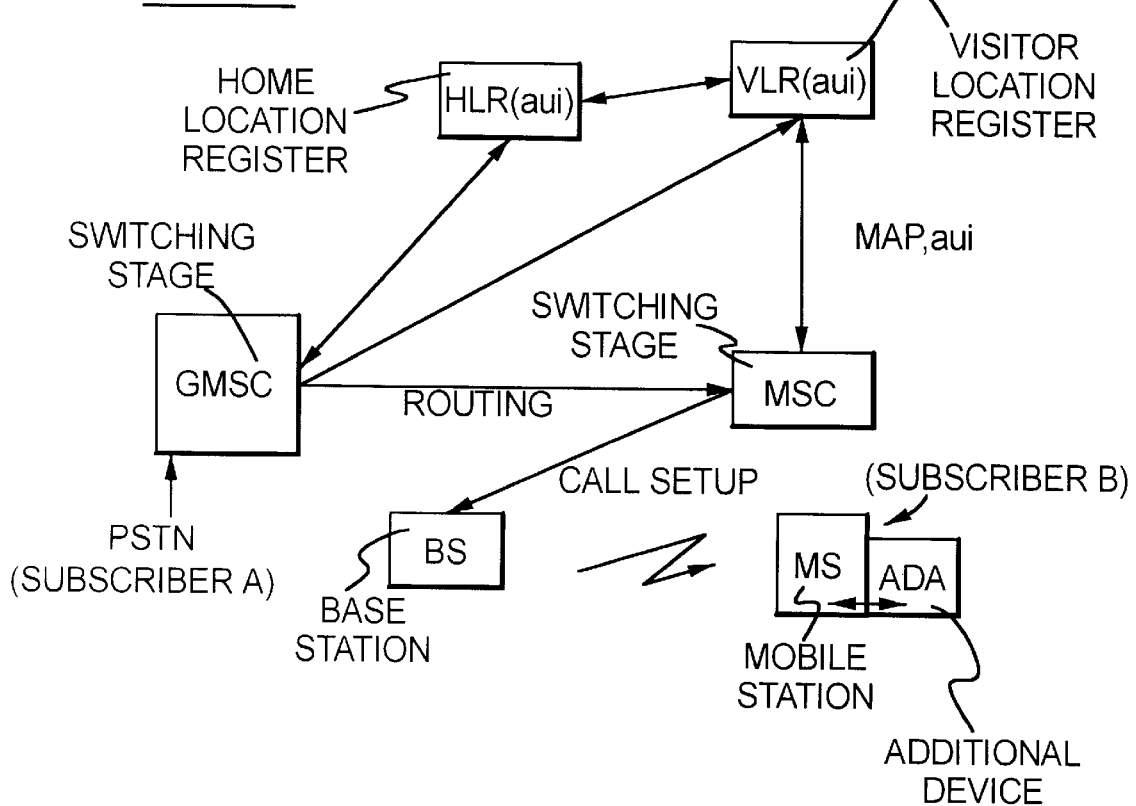
FIG. 3 schematically illustrates the components involved in the connection setup, given an incoming call for a data transmission in a mobile radiotelephone network according to the invention.

FIG. 3 shows the same components as FIG. 2, but during the execution of a call for the transmission of data, initiated by a subscriber A of the fixed network PSTN and directed to a mobile subscriber B with the mobile station MS and connected additional device ADA. The call from the fixed network PSTN arrives at the switching stage GMSC in the mobile radiotelephone network, whereupon the switching means GMSC determines the home location register HLR on the basis of the dialing information (MSISDN) effected by the subscriber A, and sets up a signaling connection. The equipment information aui stored for the subscriber B in the home location register HLR are checked for the additional devices required for a successful data transmission. If the check shows that the mobile station is not equipped with additional devices, there ensues a premature termination of the connection handling in the communication network, and transmission of a message to the subscriber A indicating that a data transmission is currently not possible.

If the check shows that the suitable additional devices are connected to the mobile station MS, the home location register HLR sends a request to the visitor location register VLR in whose coverage area the subscriber B is currently located. The items of equipment information aui can be sent to the visitor location register VLR, if they are not already stored there anyway by means of the commissioning of the mobile station MS. The visitor location register VLR sends a mobile subscriber roaming number (MSRN) back to the home location register HLR, which sends this number back to the switching stage GMSC. On the basis of the received mobile subscriber roaming number, the switching stage GMSC sets up the connection to the switching means MSC (routing), i.e. to the switching unit in whose area the mobile subscriber B is located. The switching unit MSC requests the subscriber data of the mobile subscriber from the visitor location register VLR, and initiates a radio call (paging) to all base stations BS of the region served by it. In the response to the page, an item of information concerning the radio cell in which the mobile station MS is located is sent to the switching unit MSC in the opposite direction. The switching unit MSC thereupon sets up the connection to the mobile station MS of the mobile subscriber B via the base station BS (call setup). The data are received by the mobile station MS and are supplied as an output via the connected additional device ADA.

Figure 4:
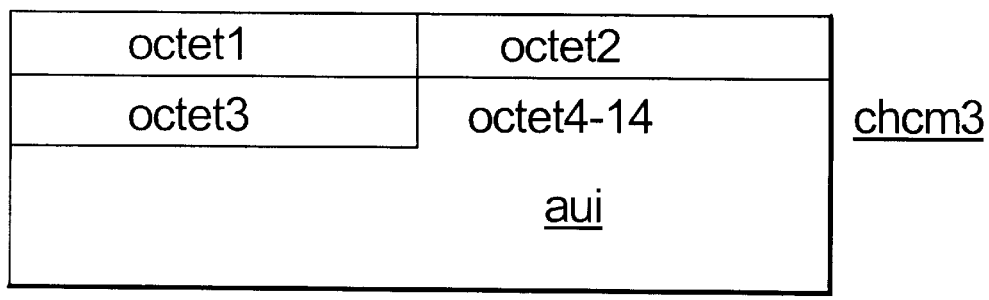
FIG. 4 schematically shows, in an exemplary embodiment, the construction or setup of the signaling message for the transmission of information concerning the equipment of the mobile station.

FIG. 4 shows an example of the content of the signaling message chcm3 that can be sent at any time to the communication network from the mobile station MS, in order to exchange information with the network. In up to a maximum of fourteen octets, octet1, octet2, octet3 and octet4–14, information (such as for example the type of information, the length of the traffic information, and the traffic information itself) are stored. The octet octet3 thereby contains, for example, information concerning whether and which encryption algorithms are supported for authentification or transmission of information from the mobile station. The equipment information aui is contained in the octets octet4–14, and provide (as described above) designations of whether and which additional devices are connected to the mobile station MS, and/or for what purpose the mobile station MS with the connected additional device can be used. In principle, an arbitrary signaling message—even with a construction or setup differing from that shown—can be used for the transmission of the equipment information aui.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for transmitting information via a radio interface between at least one mobile station, to which a subscriber has access, and a communication network, said communication network including radio-based components and switching-based components, said method comprising the steps of:

prior to a connection setup from said communication network to said mobile station, formulating equipment information at a mobile station identifying any additional devices connected to said mobile station;

prior to a connection setup from said communication network to said mobile station, transmitting said equipment information from said mobile station to said communication network;

prior to a connection setup from said communication network to said mobile station, receiving said equipment information from said mobile station at said communication network and storing said equipment information at said communication network; and during a connection setup from said communication network to said mobile station, checking the stored equipment information from said mobile station before allocating at least one of said switching based components and said radio-based components for said connection, and allocating said at least one of said switching based components and said radio-based components dependent only on said stored equipment information previously transmitted from said mobile station.

2. A method as claimed in claim 1 comprising the additional step of transmitting a signaling message from said mobile station to said communication network during commissioning of said mobile station, and including said equipment information in said signaling message.

3. A method as claimed in claim 1 comprising the additional step of transmitting a signaling message from said mobile station to said communication network during commissioning of said mobile station, and transmitting said equipment information in a subsequent signaling message from said mobile station to said communication network after said signaling message during commissioning.

4. A method as claimed in claim 3 comprising the additional steps of:

connecting at least one of said additional devices to said mobile station; and as soon as said at least one of said additional devices is connected to said mobile station, transmitting said subsequent signaling message from said mobile station to said communication network.

5. A method as claimed in claim 1 wherein said mobile station and said communication network communicate according to the GSM standard, and wherein the step of transmitting said equipment information from said mobile station to said communication network comprises inserting said equipment information into a message transmitted from said mobile station to said communication network according to the GSM standard.

6. A method as claimed in claim 1 wherein the step of transmitting said equipment information from said mobile station to said communication network comprises transmitting said equipment information from said mobile station to said communication network in a non-GSM standardized signaling message.

7. A method as claimed in claim 1 wherein the step of formulating said equipment information comprises selecting information, for inclusion in said equipment information, from the group consisting of an identification of which additional devices are connected to said mobile station, identification of whether an additional device is currently connected to said mobile station, and a purpose for which said mobile station with at least one of said additional devices connected thereto is used by said subscriber.

8. A method as claimed in claim 1 comprising the additional steps of:

connecting at least one of said additional devices to said mobile station via an interface terminal via which an operational readiness status of said at least one of said additional devices is communicated to said mobile station; and including said operational readiness status of said at least one of said additional devices in said equipment information transmitted from said mobile station to said communication network.

9. A method as claimed in claim 1 comprising the additional step of providing a mobile radio telephone network as said communication network, and providing a home location register in said mobile radio telephone network; and wherein the step of storing said equipment information comprises storing said equipment information in said home location register.

10. A method as claimed in claim 1 comprising the additional step of providing a mobile radio telephone network as said communication network, and providing a visitor location register in said mobile radio telephone network; and wherein the step of storing said equipment information comprises storing said equipment information in said visitor location register.

11. A communication network for exchanging information via a radio interface with at least one mobile station to which a subscriber has access, said communication network comprising:

a plurality of radio-based components;

a plurality of switching-based components;

said radio-based components including means for receiving equipment information from said at least one mobile station identifying any additional devices connected to said at least one mobile station;

means for storing said equipment information at said communication network; and control means for, before producing a connection to said at least one mobile station, checking said equipment information stored in said means for storing and allocating at least one of said radio-based components and said switching-based components dependent only on said previously transmitted equipment information stored in said means for storing.

12. A communication network as claimed in claim 11 wherein said receiver means comprises means for receiving updated equipment information from said at least one mobile station upon a modification of additional devices connected to said at least one mobile station, and wherein said means for storing comprises means for replacing said equipment information stored in said means for storing with said updated equipment information.

* * * * *